H. M. PIERCE.
APPARATUS FOR MAKING WOOD-CHARCOAL AND SECURING ACETIC ACID, &c.

No. 174,292.                               Patented Feb. 29, 1876.

WITNESSES                               INVENTOR

Theo. Mungen.                        Henry M. Pierce
H. B. Brown

UNITED STATES PATENT OFFICE.

HENRY M. PIERCE, OF CHICAGO, ILLINOIS.

IMPROVEMENT IN APPARATUS FOR MAKING WOOD-CHARCOAL AND SECURING ACETIC ACID, &c.

Specification forming part of Letters Patent No. 174,292, dated February 29, 1876; application filed February 18, 1876.

*To all whom it may concern:*

Be it known that I, HENRY M. PIERCE, of Chicago, in the county of Cook and State of Illinois, have invented certain new and useful Improvements in Treating Wood for the Production of Acetic Acid, Wood Spirit and Charcoal; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in providing for ordinary charcoal-kilns, a system of tubes and chambers, and exhaust and projector, by which I collect the pyroligneous matter thrown off in the course of the carbonization of the wood, so that the same may be saved and utilized, as hereinafter more fully set forth and described.

The object of my invention is the withdrawal of the pyroligneous gases generated in the course of the destructive distillation of wood in the common charcoal-kilns, from those kilns, and the collection or recovering of the same in an adjoining building, chamber, or chambers, and then the withdrawal of the uncondensed gases from such receptacle, and forcing the same back into the kiln, where their consumption shall aid in the further carbonization of the wood, or I economize them for heating or illuminating purposes.

To enable others skilled in the art to make and use my invention I will describe its construction and operation.

The following method I apply to all kilns used for the carbonization of wood for charcoal, whether made of brick, stone, or other material.

Figure 1:
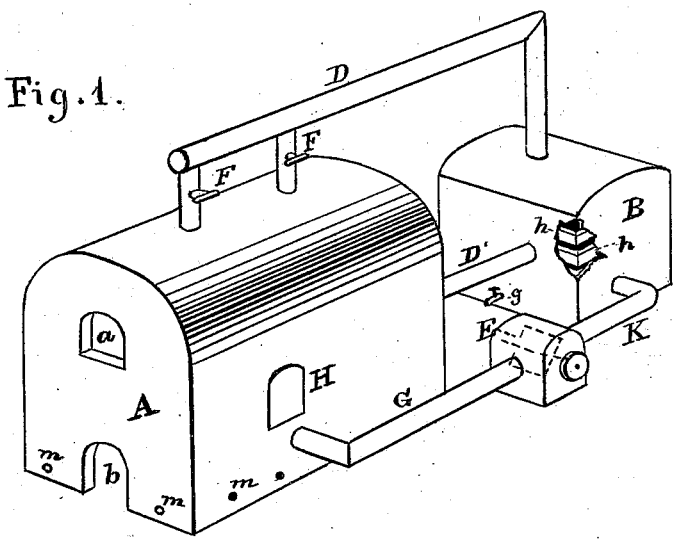
Figure 2:
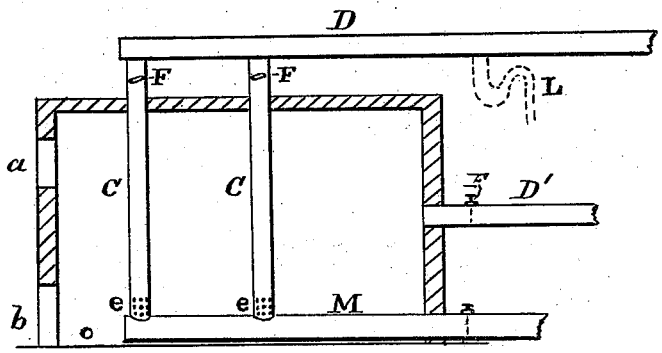

In the accompanying drawing, which illustrates my invention, and forms a part of this specification, Figure 1 is a perspective view of a charcoal-kiln, with my improvements applied. Fig. 2 is a vertical longitudinal section.

In the said drawing, A designates a charcoal-kiln, having the doors *a b* for charging the kiln with wood. One or more vacuum-pipes, C, pass down through the top of the kiln to the bottom, where they connect with a gutter or flue, M, passing along the center of the bottom of the kiln, the said pipes C being perforated at *e* for the admission of the gases to the tubes from the body of the kiln. The said tubes at their upper extremities, outside of the kiln, connect with the pipe D which extends to the chamber B located near the kiln. The stop-cocks F F are for shutting off the gases when desired. The gutter or flue M is used for conveying away tarry or liquid matter. B is a chamber or building erected near the kiln, and filled with lime or other suitable material, placed on shelves or in trays *h* for the purpose of absorbing and holding the acetic acid and wood-spirit. In lieu of lime any other substance that will attack and retain these pyroligneous products may be used. *g* is a spigot for drawing off condensed tarry and liquid matter. K is a pipe leading from the chamber B to the exhaust and projector E. G is a pipe leading from the projector to the kiln for conveying the uncondensed and uncondensable gases back to the kiln for further carbonization of the wood. H designates the door to an oven, which is used when the carbonization is not carried on by firing the mass of wood in the kiln. This oven has a grate, an ash-pit, and air-inlets and dampers of the usual construction. It is also perforated in any part of its arch. The pipe G extends within it, and may also be perforated. From the rear of this oven may be extended one or more perforated pipes. In the process of carbonization I do not confine myself to the use of ovens, but may fire the mass of wood in the kiln directly.

As modifications of my construction the perforated vacuum-tubes C may pass up the walls of the kiln on the inside, or may pass around the entire interior of the kiln in a horizontal or inclined position at any elevation from the bottom of the kiln and connect with a pipe, D′, leading to the chamber B, as shown. One or more condensing chambers or buildings may be used and located at greater or less distances from the kiln on one or more sides, or even a portion of the kiln itself may be divided off for chambers for collecting the gases. The flues C, D, D′, E, G, and M, and the chamber B, may be made of iron, wood, brick, or any other suitable material. Instead of using the uncondensed and uncondensable gases for carbonizing the wood I may prepare and use them for heating and illuminating purposes. A trap, as indicated by dotted lines at L, for carrying off liquid and tarry matter may be provided.

The operation of my apparatus is as follows: The kiln is charged in the usual manner, at first through the door $b$, which is then sealed, and afterward through the upper door $a$, which is also sealed. A wood or other fire is then started in the oven at H. The valves F are opened and the products are drawn by the exhaust from the kiln into and through the recovering-chamber, where the acids and spirits are retained by any suitable material, such as lime, magnesia, baryta, or soda, which will retain them. The uncondensed gases are withdrawn from the recovering-chamber and projected through the pipe G into the oven, and perforated pipes attached thereto, where they are inflamed by the fire in the oven. The liquid products or condensations find outlets from the outlet-flue at the trap L from the recovering-chamber at $g$, and from the kiln by the flue or gutter M, the bottom of the kiln being inclined to direct such liquids to the gutter.

When I do not use the oven or ovens, the kiln having been charged, as specified, the charge is lighted through the upper door $a$, the pipe G is detached from the kiln, and the gases forced from E may be burned or otherwise destroyed, or be utilized for any desired purpose.

At any stage of the carbonization, usually when the acids and spirits cease to be distilled, I detach the outlet D from the recovering-chamber B, and connect it directly with the exhaust and forcer E.

By this apparatus charcoal can be made, the gases absorbed, consumed, or rendered inoffensive, and the valuable products resulting from the carbonization of the immense quantities of wood consumed in this country be economized.

I am aware that the products arising from kilns during the carbonization of wood to produce charcoal have been suffered to escape into a conduit to a chamber, where some of the valuable constituents of such products have been recovered, and this I do not claim.

What I do claim is—

1. In a charcoal-kiln, the combination of one or more flues opening below the upper surface of the charge, and each having a shut-off, an outlet-flue, a recovering-chamber, and a flue or gutter within the kiln for the withdrawal of the liquid products of combustion, as and for the purpose described.

2. In combination with a charcoal-kiln, having flues opening below the surface of the charge and an outlet-flue, a recovering-chamber within or adjacent to the kiln, and an exhaust for withdrawal of products of combustion from the kiln into the recovering-chamber, as described.

3. In combination with the charcoal-kiln, having flues opening below the surface of the charge, and an outlet-flue, a recovering-chamber within or adjacent to the kiln, and exhaust and forcer, and a conduit from the latter, and communicating with the interior of the kiln, as and for the purpose described.

In testimony that I claim the foregoing as my own I have affixed my signature in presence of two witnesses.

HENRY M. PIERCE.

Witnesses:
  THEODORE MUNGEN,
  H. A. DANIELS.